United States Patent
Clothier et al.

(10) Patent No.: US 9,825,933 B2
(45) Date of Patent: Nov. 21, 2017

(54) SINGLE SIGN ON FOR APPLICATIONS (71) Applicant: Data Accelerator Ltd., London (GB)

(72) Inventors: Matthew P. Clothier, Chedzoy (GB); Sean P. Corbett, London (GB)

(73) Assignee: DATA ACCELERATOR LTD., London (GB)

( * ) Notice: Subject to any disclaimer, the term of this patent is extended or adjusted under 35 U.S.C. 154(b) by 0 days.

(21) Appl. No.: 14/485,665

(22) Filed: Sep. 12, 2014

(65) Prior Publication Data
US 2015/0074783 A1 Mar. 12, 2015

Related U.S. Application Data (60) Provisional application No. 61/877,212, filed on Sep. 12, 2013.

(51) Int. Cl.
*H04L 29/06* (2006.01)

(52) U.S. Cl.
CPC .................................. *H04L 63/0815* (2013.01)

(58) Field of Classification Search
CPC .......................... H04M 1/2473; H04L 63/0815
USPC ................................................................ 726/8
See application file for complete search history.

(56) References Cited

U.S. PATENT DOCUMENTS

| | | | | |
|---|---|---|---|---|
| 2004/0003081 A1* | 1/2004 | Justus | ................. | H04L 63/0815 709/225 |
| 2009/0249448 A1* | 10/2009 | Choi | ................... | H04L 63/0815 726/4 |
| 2011/0154464 A1* | 6/2011 | Agarwal | ............. | H04L 63/0815 726/8 |
| 2011/0277026 A1* | 11/2011 | Agarwal | ................. | G06F 21/41 726/8 |
| 2014/0032758 A1* | 1/2014 | Barton | ................... | H04L 41/00 709/225 |
| 2014/0189808 A1* | 7/2014 | Mahaffey | ............ | H04L 63/0853 726/4 |
| 2014/0208408 A1* | 7/2014 | Bilgen | ................ | H04L 63/0815 726/8 |
| 2014/0298449 A1* | 10/2014 | Low | .......................... | G06F 3/01 726/19 |
| 2014/0337954 A1* | 11/2014 | Ahmed | ................... | G06F 21/41 726/8 |

OTHER PUBLICATIONS

Petullo, W. Michael et al., "MinimaLT: Minimal-latency Networking Through Better Security," May 22, 2013 [retrieved online at http://cr.yp.to/tcpip/minimalt-20130522.pdf on Jun. 4, 2013].

* cited by examiner

*Primary Examiner* — Izunna Okeke
*Assistant Examiner* — Sakinah Taylor (57) ABSTRACT

Systems and method for providing single sign on access to an application executing at a client device. An API request is intercepted at the client device for signing on a user of the client device for accessing the application. The API request is sent to a remote system where user credentials are determined based on the intercepted API request. The user credentials are returned to the client device where they are used to agnostically sign on the user for accessing the application.

18 Claims, 8 Drawing Sheets

SINGLE SIGN ON FOR APPLICATIONS

CROSS REFERENCE TO RELATED APPLICATIONS

This application claims the benefit of U.S. Provisional Patent Application Ser. No. 61/877,212, filed on Sep. 12, 2013, entitled "SINGLE SIGN ON FOR LOCALLY INSTALLED APPLICATIONS," which is incorporated herein by reference.

BACKGROUND

An area of ongoing research and development is providing single sign on access to applications for users. Traditionally, single sign on access has been developed for web-based applications executed at a client device and not for applications residing in their entirety or partially in their entirety on a client device. There therefore exists the need for providing single sign on access for applications residing in their entirety or partially in their entirety on a client device Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various implementations, single sign on access to an application executing at a client device is provided. In various implementations, an API request is intercepted at the client device for signing on a user of the client device for accessing the application. Further, in various implementations, the API request is sent to a remote system where user credentials are determined based on the intercepted API request. In various implementations, the user credentials are returned to the client device where they are used to agnostically sign on the user for accessing the application.

These and other advantages will become apparent to those skilled in the relevant art upon a reading of the following descriptions and a study of the several examples of the drawings.

DETAILED DESCRIPTION

Figure 1:
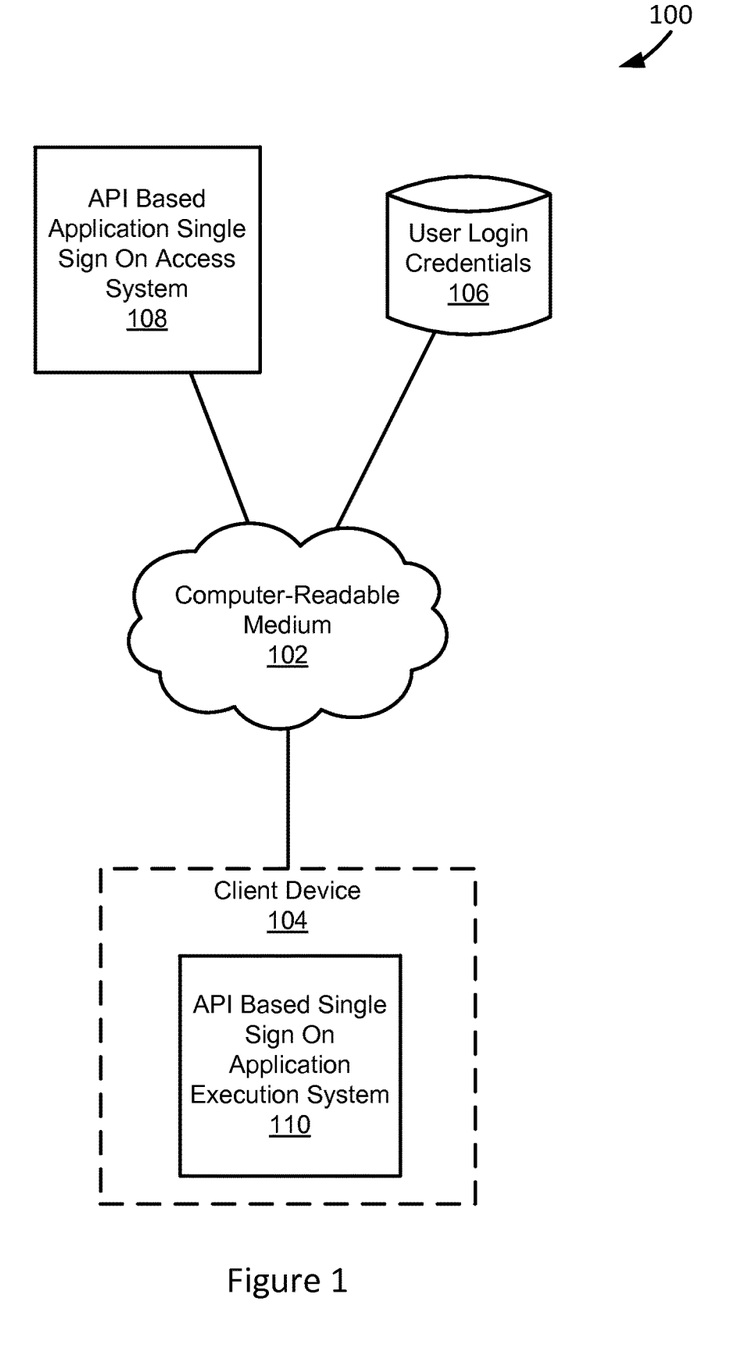
FIG. 1 depicts a diagram of an example of a system for providing single sign on access to applications executed on a client device using intercepted API requests for the applications.

FIG. 1 depicts a diagram 100 of an example of a system for providing single sign on access to applications executed on a client device using intercepted API requests for the applications. The system of the example of FIG. 1 includes a computer-readable medium 102, a client device 104, a user login credentials datastore 106, and an API based application single sign on access system 108.

The client device 102, the user long credentials datastore 106, and the API based application single sign on access system 108 are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or LAN. The computer-readable medium 102 can also encompass a relevant portion of a WAN or other network, if applicable.

The computer-readable medium 102, the client device 104, the API based application single sign on access system 108, and other applicable systems, or devices described in this paper can be implemented as a computer system, a plurality of computer systems, or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor and 2) hardware, firmware, and/or software modules that are executed by the processor. Depending upon implementation-specific or other considerations, an engine can be centralized or its functionality distributed. An engine can include special purpose hardware, firmware, or software embodied in a computer-readable medium for execution by the processor. The processor transforms data into new data using implemented data structures and methods, such as is described with reference to the FIGs. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

In a specific implementation, the client device 104 functions according to an applicable device for executing an application. In executing an application, the client device can send and receive data. Depending upon implementation-specific or other considerations, an application executed at the client device 104 can reside only partially on the client device, thereby leading to virtualization of the application on the client device 104. Further depending upon implementation-specific or other considerations, the client device 104 can be a thin client or an ultra-thin client.

In a specific implementation, the user login credentials datastore 106 functions to store user credentials of a user of the client device 104. User credentials stored in the user login credentials datastore 106 can be received from the client device 104. Depending upon implementation-specific or other considerations, user credentials can be received from the client device at the beginning of every session a user has with the client device 104, or during a previous session the user had with the client device 104. For example, if a user interacted with applications on the client device 104 a week ago, user credentials of the user could have been received when the user interacted with applications on the client device 104 a week ago. Depending upon implementation-specific or other considerations, the user login credentials datastore 106 can store application data for applications executing on the client device 104. For example, the user login credentials datastore can store a configuration of an application executing on the client device 104.

In a specific implementation, the API based application single sign on access system 108 functions to provide user credentials for single sign on access of a user in accessing applications at the client device based on an intercepted API request at the client device 104. Specifically, the API based application single sign on access system 108 can provide user credentials based on an intercepted API request made by an application for signing in a user for access to the application. Depending upon implementation-specific or other considerations, an application which the API based application single sign on access system 108 providers user credentials for single sign on access can be either an application that resides in its entirety on the client device 104 or an application that is virtualized at the client device 104.

In a specific implementation, the API based application single sign on access system 108 is remote from the client device 104 and functions to received data from the client device 104. Depending upon implementation-specific or other considerations, the API based application single sign on access system 108 can receive application data for applications executing on the client device from client device. Additionally, the API based application single sign on access system 108 can received intercepted API requests for signing on a user to access applications executing on the client device from the client device.

In a specific implementation, the API based application single sign on access system 108 functions to determine credentials necessary to sign on a user for accessing an application executing on the client device. Credentials necessary to sign on a user for accessing an application executing on the client device can be specific to applications. Depending upon implementation-specific or other considerations, the API based application single sign on access system 108 can determine credentials necessary to sign a user on for accessing an application based on application data for the application. Further depending upon implementation-specific or other considerations, the API based application single sign on access system 108 can determine credentials necessary to sign a user on for accessing an application based on an intercepted API request. For example, if an intercepted API request for an application indicates that a user name and a password are needed, then the API based application single sign on access system 108 can determine that a user name and a password are needed to sign on a user for accessing the application.

In a specific implementation, the API based application single sign on access system 108 functions to determine user credentials for signing on a user to access an application. The API based application single sign on access system 108 can determine user credentials for signing on a user based on determined credentials necessary to sign on a user for accessing an application. The API based application single sign on access system 108 can determine user credentials for signing on a user to access an application from user credentials stored in the user login credentials datastore 106. For example if the API based application single sign on access system 108 determines that a user name and a password are necessary to sign on a user for accessing an application, the API based application single sign on access system 108 can determine a user name and a password of a user from the user credentials stored in the user login credentials datastore 106.

In a specific implementation, the API based application single sign on access system 108 determines a configuration of an application for execution on the client device 104. For example, the API based application single sign on access system 108 can determine settings for executing an application at the client device. The API based application single sign on access system 108 can determine a configuration for an application from application data for the application. For example if application data specifies a specific configuration of the application for a user, then the API based application single sign on access system 108 can determine the specific configuration of the application. Depending upon implementation-specific or other considerations, the API based application single sign on access system 108 can determine a configuration of an application that is either or both specific to the client device 104 which the application is executing on and a user of the client device 104 accessing the application.

In a specific implementation, the API based application single sign on access system 108 functions to transmit data to the client device 104. The API based application single sign on access system 108 can transmit determined user credentials for signing on a user to access an application executing at the client device 104. Depending upon implementation-specific or other considerations, the API based application single sign on access system 108 can transmit a determined configuration of an application executing on the client device 104.

In the example system shown in FIG. 1, the client device 104 includes an API based single sign on application execution system 110. In a specific implementation, the API based single sign on application execution system 110 functions to provide single sign on access to applications executing at the client device 104 based on intercepted API requests. The API based single sign on application execution system 110 can provider single sign on access to application executing at the client device 104 from user credentials for a user of the client device 104, received from the API based application single sign on access system 108.

In a specific implementation, the API based single sign on application execution system 110 functions to intercept API requests of applications executing at the client device 104. the API based single sign on application execution system 110 can be configured to intercept API requests made by an application for singing on a user to use the application. Depending upon implementation-specific or other considerations, the API based single sign on application execution system 110 or applicable portions of the API based single sign on application execution system 110 can be implemented through additional code added to an application to cause the API requests to be intercepted. Additional code for implementing the API based single sign on application execution system 110 or applicable portions of the API based single sign on application execution system 110 at the client device 104 can be dynamically injected at runtime of the application. Further depending upon implementation-specific or other considerations, the API based single sign on application execution system 110 or applicable portions of the API based single sign on application execution system 110 can be implemented as a library in an application executing at the client device. Depending upon implementation-specific or other considerations, the API based single sign on application execution system 110 can be configured to instruct an operating system of the client device 104 to hide or otherwise not display a login form window of an application, for which the API based single sign on application execution system 110 intercepts an API request.

In a specific implementation, the API based single sign on application execution system 110 can inspect API requests made by an application and determine whether to intercept the API requests. For example, the API based single sign on application execution system 110 can inspect API requests to determine whether they are used for signing on a user to use an application, and appropriately intercept the API requests if it determined that the API requests are for signing on the user. Depending upon implementation-specific or other considerations, in intercepting API requests of an application, the API based single sign on application execution system 110 or an applicable portion of the API based single sign on application execution system 110 can be implemented in a layer between the application executing in an application layer and an operating system executing in an operating system layer of the client device. Further depending upon implementation-specific or other considerations, the API based single sign on application execution system 110 or an applicable portion of the API based single sign on application execution system 110 can be implemented as part of an operating system layer in which an operating system is executed on the client device or a hypervisor layer on the client device.

In a specific implementation, the API based single sign on application execution system 110 functions to identify application data of an application executing on the client device. Application data for an application can include an identification of the application. The API based single sign on application execution system 110 can determined an identification of the application using an intercepted API request. Depending upon implementation-specific or other considerations, application data for an application can include a configuration of the application on the client device. For example, if the application is configured uniquely for execution on a client device, the API based single sign on application execution system 110 can identify the configuration of the application. The API based single sign on application execution system 110 can determine a configuration of an application executing at a client device, either or both from a current execution of the application on the client device or a previous execution of the application on the client device.

In a specific implementation, the API based single sign on application execution system 110 functions to send data to the API based application single sign on access system 108. The API based single sign on application execution system 110 can send API requests for signing on a user to access an application intercepted by the API based single sign on application execution system 110. The API based single sign on application execution system 110 can send user credentials of a user of the client device 104 for storing in the user login credentials datastore 106. Additionally, the API based single sign on application execution system 110 can send application data for an application executing at a client device 104.

In a specific implementation, the API based single sign on application execution system 110 functions to communicate with the API based application single sign on access system 108. In communicating with the API based application single sign on access system 108, the API based single sign on application execution system 110 can received determined user credentials used in signing on a user for accessing an application. Depending upon implementation-specific or other considerations, the API based single sign on application execution system 110 can receive a determined configuration for an application executing at the client device.

In a specific implementation, the API based single sign on application execution system 110 functions to sign on a user for accessing an application executing on the client device. In singing on a user, the user is agnostic as to that they are being signed on to an application. Specifically, the user does not view a login page and does not need to input their credentials for signing on to the application, after the user has initially input their user credentials, thereby accomplishing single sign on access. In singing on a user, the API based single sign on application execution system 110 can populate field in a login page and activate a submit button for achieving sign on to an application. Depending upon implementation-specific or other considerations, the API based single sign on application execution system 110 can generate an API response based on received user credentials to cause a user to be signed in for accessing an application. Further depending upon implementation-specific or other considerations, the API based single sign on application execution system 110 can identify objects in a login page that need to be input in order to sign on a user and send an API response to the application to cause these fields to be populated. Depending upon implementation-specific or other considerations, the API based single sign on application execution system 110 can identify an object that is used to submit data populated in determined fields for sign on a user, and send an API response to cause the object to be activated after the fields have been populated.

In a specific implementation, the API based single sign on application execution system 110 functions to manipulate an application according to a determined configuration of the application. Depending upon implementation-specific or other considerations, a configuration of an application can be determined from application data for the application. Further depending upon implementation-specific or other considerations, the API based single sign on application execution system 110 can manipulate an application according to a configuration of an application specific to either or both a user or the client device. In manipulating the application, the API based single sign on application execution system 110 can set up or change setting of an application based on a determined configuration of the application.

In an example of operation of the example system shown in FIG. 1, the API based single sign on application execution system 110 intercepts an API request, from an application executing at the client device 104, for signing on a user to access the application. In the example of operation of the example system shown in FIG. 1, the API based application single sign on access system 108 determines user credentials used for signing on the user to access the application based on the intercepted API request. Further in the example, of operation of the example system shown in FIG. 1, the API based single sign on application execution system 110 uses the user credentials determined by the API based application single sign on access system 108 to agnostically sign on a user of the client device 104 for accessing the application, resulting in single sign on into the application.

Figure 2:
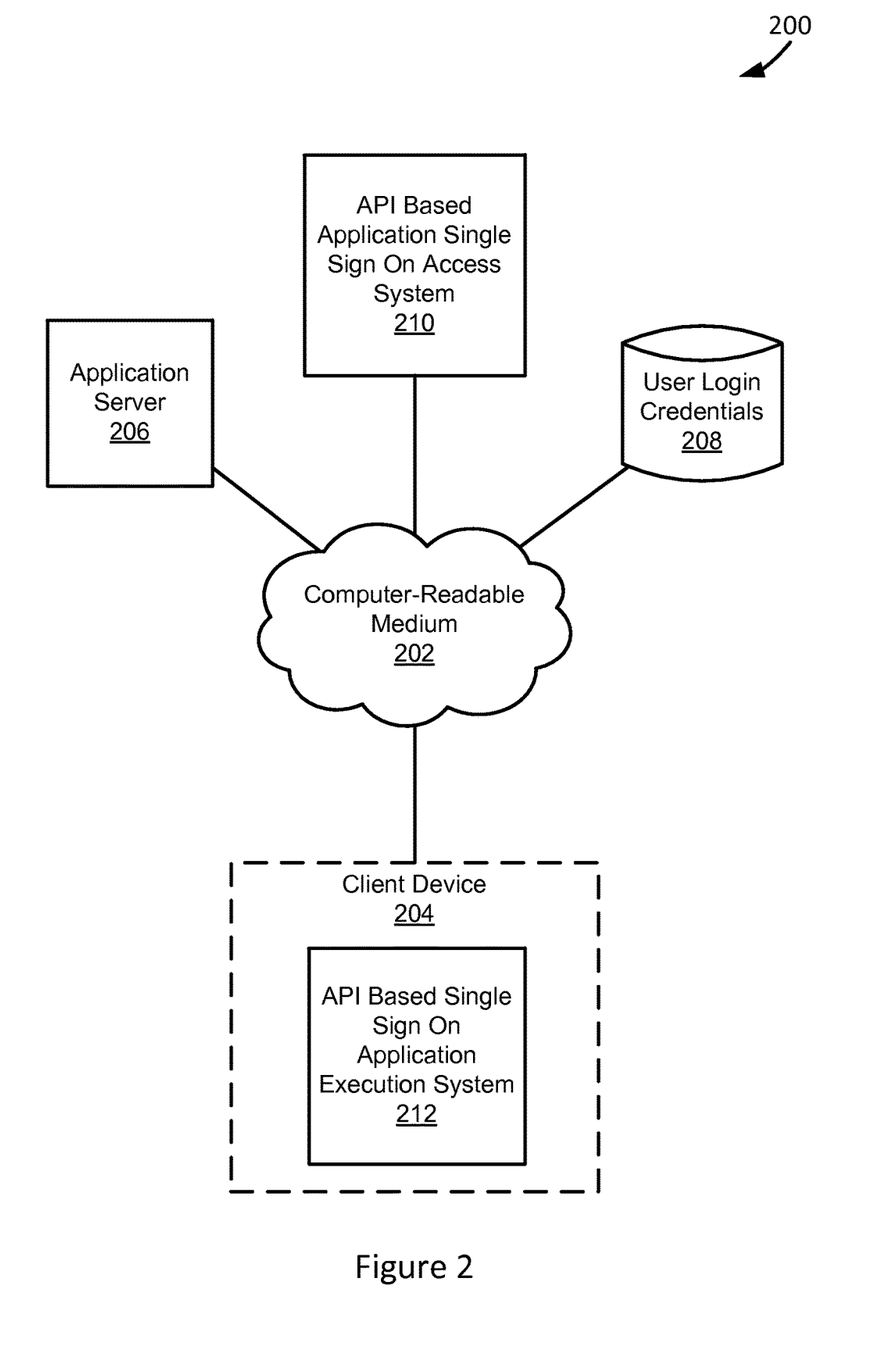
FIG. 2 depicts a diagram of an example of a system for providing single sign on access to an application virtualized on a client device using intercepted API requests for the applications.

FIG. 2 depicts a diagram 200 of an example of a system for providing single sign on access to an application virtualized on a client device using intercepted API requests for the applications. The example system shown in FIG. 2 includes a computer-readable medium 202, a client device 204, an application server 206, a user login credentials datastore 208, and an API based application single sign on access system 210. In the example system shown in FIG. 2, the client device 204, the application server 206, the user login credentials datastore 208, and the API based application single sign on access system 210 are coupled to each other through the computer-readable medium 202.

In a specific implementation, the client device 204 functions according to an applicable device for executing an application virtualized on the client device. In executing an application virtualized on the client device 204, the client device 204 can send and receive data. For example, the client device 204 can receive portions of an application as they are needed to continue execution of the application. Further depending upon implementation-specific or other considerations, the client device 204 can be a thin client or an ultra-thin client.

In a specific implementation, the application server 206 functions to provider portions of an application virtualized on the client device 204 to the client device 204. Depending upon implementation-specific or other considerations, the application server 206 can provide portions of the application to the client device 204 in response to requests for the portions of the application received from the client device 204. Further depending upon implementation-specific or other considerations, the application server 206 can predict portions of an application that will be needed by the client device and send the predicted portions of the application to the client device 204.

In a specific implementation, the user login credentials datastore 208 functions to store user credentials of a user of the client device 204. User credentials stored in the user login credentials datastore 208 can be received from the client device 204. Depending upon implementation-specific or other considerations, user credentials can be received from the client device at the beginning of every session a user has with the client device 204, or during a previous session the user had with the client device 204. Depending upon implementation-specific or other considerations, the user login credentials datastore 208 can store application data for applications executing on the client device 208. For example, the user login credentials datastore can store a configuration of an application executing on the client device 204.

In a specific implementation, the API based application single sign on access system 210 functions according to an applicable system for returning user credentials based on an intercepted API request, such as the API based application single sign on access systems described in this paper. The API based application single sign on access system 210 can determined credentials necessary to sign a user onto accessing an application executing at a client device using an intercepted API request to sign on the user. The API based application single sign on access system 210 can use determined credentials necessary to sign a user onto accessing an application to determined specific user credentials for signing a specific user onto the application. The API based application single sign on access system 210 can return determined user credentials to the client device 204. Depending upon implementation, specific or other considerations, the API based application single sign on access system 210 can determine a configuration of an application and send the configuration of the application to the client device 204.

In the example system shown in FIG. 2, the client device 204 includes an API based single sign on application execution system 212. In a specific implementation, the API based single sign on application execution system 212 functions according to an applicable system for providing single sign on access to applications using remote received user credentials, such as the API based single sign on application execution systems described in this paper. The API based single sign on application execution system 212 can be configured to intercept an API request for signing a user on to an application. The API based single sign on application execution system 212 can also be configured to sign on a user for accessing an application using user credentials received from a remote source in response to an intercepted API request. Depending upon implementation-specific or other considerations, the API based single sign on application execution system 212 can manipulate an application to execute according to a determined configuration for the application.

Figure 3:
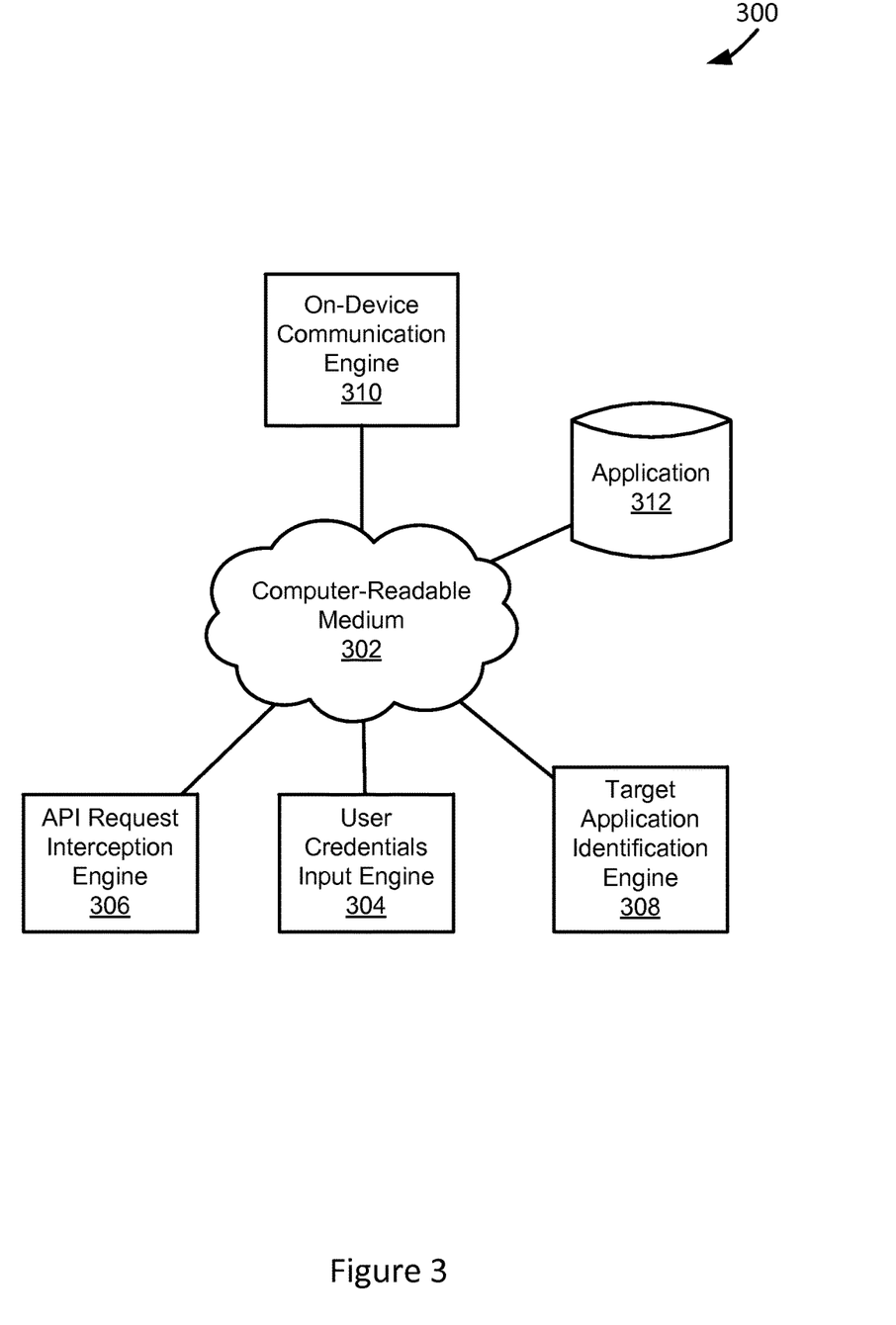
FIG. 3 depicts a diagram of an example of an API based single sign on application execution system implemented on a client device.

FIG. 3 depicts a diagram 300 of an example of an API based single sign on application execution system implemented on a client device. The example system shown in FIG. 3 includes a computer-readable medium 302, a user credentials input engine 304, an API request interception engine 306, a target application identification engine 308, an on-device communication engine 310, and an application datastore 312. In the example system shown in FIG. 3, the user credentials input engine 304, the API request interception engine 306, the target application identification engine 308, the on-device communication engine 310, and the application datastore 312 are coupled to each other the computer-readable medium 302.

In a specific implementation, the user credentials input engine 304 functions to receive user credentials for a user in accessing applications executing on the client device. Depending upon implementation-specific or other considerations, applications executing on the client device can be web-based applications, or applications residing at the client device. Further depending upon implementation-specific or other considerations, applications executing on the client device can reside partially on the client device and therefore be virtualized on the client device. The user credentials input engine 304 can receive user credentials from a user either or both every time a user begins a session on a client device, or the first session the user has on the client device. User credentials received by the user credentials input engine 304 can include an identification of a user, a username of a user, a password of a user, and setting specific to the user in executing a specific application.

In a specific implementation, the API request interception engine 306 functions to intercept API requests of applications executing at the client device. The API request interception engine 306 can be configured to intercept API requests made by an application for singing on a user to use the application. Depending upon implementation-specific or other considerations, the API request interception engine 306 can be implemented through additional code added to an application to cause the API requests to be intercepted. Additional code for implementing the API request interception engine 306 at the client device can be dynamically injected at runtime of the application. Further depending upon implementation-specific or other considerations, the API request interception engine 306 can be implemented as a library in an application executing at the client device. Depending upon implementation-specific or other considerations, the API request interception engine 306 can be configured to instruct an operating system of the client device to hide or otherwise not display a login form window of an application, for which the API request interception engine 306 intercepts an API request.

In a specific implementation, the API request interception engine 306 can inspect API requests made by an application and determine whether to intercept the API requests. For example, the API request interception engine 306 can inspect API requests to determine whether they are used for signing on a user to use an application, and appropriately intercept the API requests if it determined that the API requests are for signing on the user. Depending upon implementation-specific or other considerations, in intercepting API requests of an application, the API request interception engine 306 can be implemented in a layer between the application executing in an application layer and an operating system executing in an operating system layer of the client device. Further depending upon implementation-specific or other considerations, the API request interception engine 306 can be implemented as part of an operating system layer in which an operating system is executed on the client device or a hypervisor layer on the client device.

In a specific implementation, the target application identification engine 308 functions to identify application data of an application executing on the client device. Application data for an application can include an identification of the application. The target application identification engine 308 can determined an identification of the application using an API request from the application intercepted by the API request interception engine 306. Depending upon implementation-specific or other considerations, application data for an application can include a configuration of the application on the client device. For example, if the application is configured uniquely for execution on a client device, the target application identification engine 308 can identify the configuration of the application. The target application identification engine 308 can determine a configuration of an application executing at a client device, either or both from a current execution of the application on the client device or a previous execution of the application on the client device.

In a specific implementation, the on-device communication engine 310 functions to send data remotely to a system for providing single sign on access to applications executing at a client device. The on-device communication engine 310 can communicate with an applicable system for providing single sign on access to applications executing at a client device, such as the API based application single sign on access systems described in this paper. The on-device communication engine 310 can send API requests for signing on a user to access an application intercepted by the API request interception engine 306. The on-device communication engine 310 can send user credentials of a user of the client device received by the user credentials input engine 304. Additionally, the on-device communication engine 310 can send application data for an application executing at a client device, as determined by the target application identification engine 308.

In a specific implementation, the application datastore 312 functions to store application data for an application executing at the client device. Application data stored in the application datastore 312 can include an identification of an application executing at the client device and/or a configuration of the application executing at the client device. Depending upon implementation-specific or other considerations, application data stored in the application datastore 312 can be generated by the target application identification engine 308.

In an example of operation of the example system shown in FIG. 3, the user credentials input engine 304 functions to receive use credentials of a user for signing on to applications executing at a client device. In the example of operation of the example system shown in FIG. 3, the API request interception engine 306 functions to intercept API requests for signing on the user to access the applications executing at the client device. Additionally, in the example of operation of the example system shown in FIG. 3, the target application identification engine 308 functions to determine application data for the applications executing at the client device. In the example of operation of the example system shown in FIG. 3, the on-device communication engine 310 functions to send the intercepted API requests to a system remote from the client device for providing single sign on access for a user to the applications executing at the client device.

Figure 4:
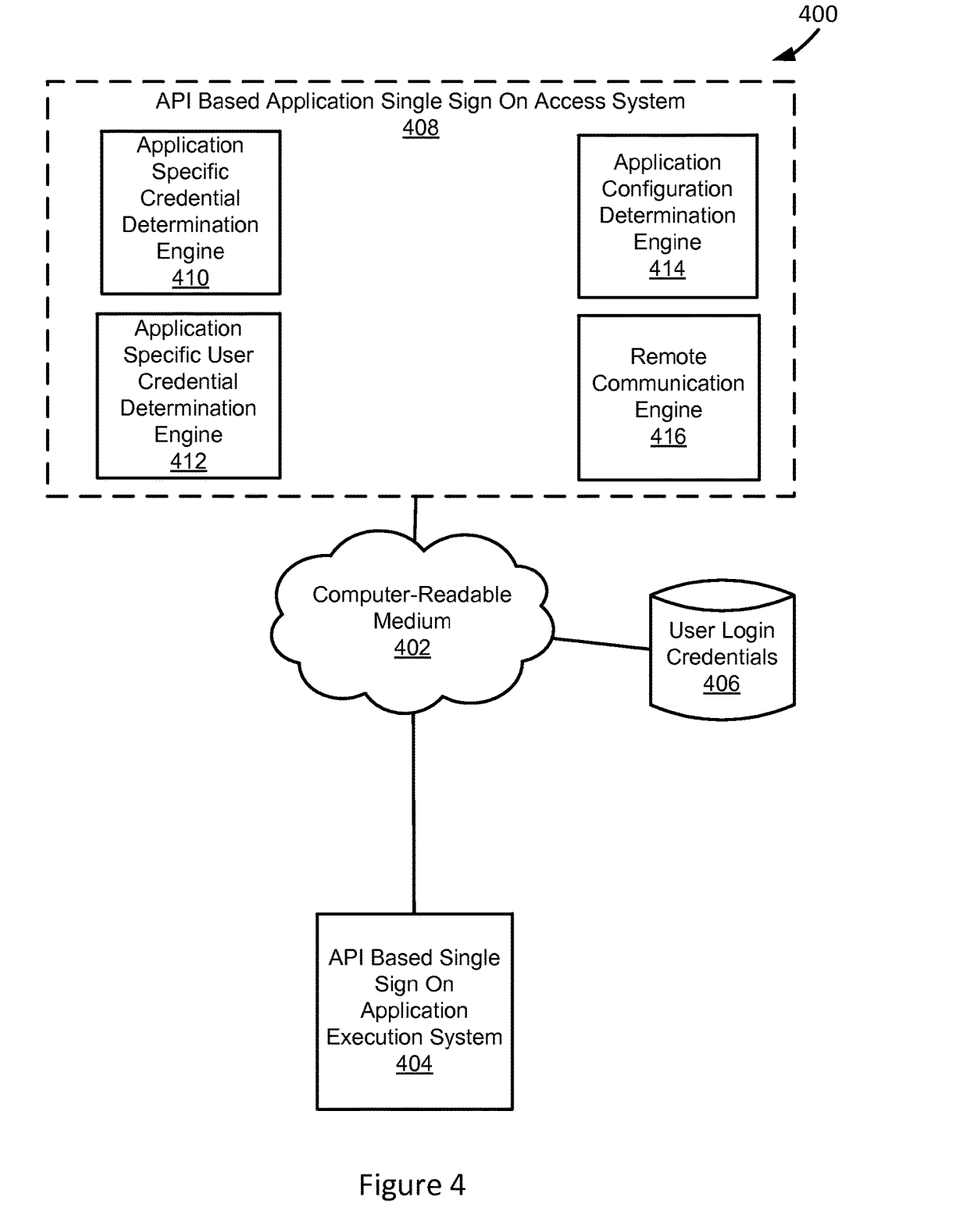
FIG. 4 depicts a diagram of an example of a system for providing user credentials remotely to a client device for single sign on access for a user to applications executing on a client device based on APIs.

FIG. 4 depicts a diagram 400 of an example of a system for providing user credentials remotely to a client device for single sign on access for a user to applications executing on a client device based on APIs. The example system shown in FIG. 4 includes a computer-readable medium 402, an API based single sign on application execution system 404, a user login credentials datastore 406, and an API based application single sign on access system 408. In the example system shown in FIG. 4, the API based single sign on application execution system 404, the user login credentials datastore 406, and the API based application single sign on access system 408 are coupled to each other through the computer-readable medium 402. In the example system shown in FIG. 4, the API based single sign on application execution system 404 is implemented as part of a client device used by a user for accessing applications executing at the client device.

In a specific implementation, the API based single sign on application execution system 404 functions according to an applicable system for providing single sign on access to applications at a client device using intercepted APIs, such as the API based single sign on application execution systems described in this paper. The API based single sign on application execution system 404 can provider user credentials input by a user of the client device. Depending upon implementation-specific or other considerations, the API based single sign on application execution system 404 can provide application data for applications executing at the client device. Additionally, the API based single sing on application execution system 404 can provide intercepted API requests for signing a user in to access an application executing at the client device.

In a specific implementation, the user login credentials datastore 406 functions to store user credentials of a user of the client device. User credentials stored in the user login credentials datastore 406 can be received from the API based single sign on application execution system 404. Depending upon implementation-specific or other considerations, the user login credentials datastore 406 can store application data for applications executing on the client device. For example, the user login credentials datastore can store a configuration of an application on the client device.

In a specific implementation, the API based application single sign on access system 408 functions according to an applicable system for remotely providing user credentials for single sign on of a user to applications executing at the client device. In providing user credentials for single sign on of a user for access to applications, the API based application single sign on access system 408 can determine applicable user credentials based on an API request for signing on a user for an application, intercepted at the client device. The API based application single sign on access system 408 can determine what credentials are necessary to sign a user on for a specific application. Additionally, the API based application single sign on access system 408 can determine a configuration of an application executing on the client device.

In the example system shown in FIG. 4, the API based application single sing on access system 408 includes an application specific credential determination engine 410, a user login credential determination engine 412, an application specific user credential determination engine 412, an application configuration determination engine 414, and a remote communication engine 416. In a specific implementation, the remote communication engine 416 functions to received data from the API based single sign on application execution system 404. Depending upon implementation-specific or other considerations, the remote communication engine 416 can receive application data for applications executing on the client device from the API based single sign on application execution system 404. Additionally, the remote communication engine 416 can received intercepted API requests for signing on a user to access applications executing on the client device from the API based single sign on application execution system 404.

In a specific implementation, the application specific credential determination engine 410 functions to determine credentials necessary to sign on a user for accessing an application executing on the client device. Credentials necessary to sign on a user for accessing an application executing on the client device can be specific to applications. For example the application specific credential determination engine 410 can determine that only a user name is necessary to sign on for one application and determine a user name and a password are necessary to sign on for another application. Depending upon implementation-specific or other considerations, the application specific credential determination engine 410 can determine credentials necessary to sign a user on for accessing an application based on application data for the application. For example, the application specific credential determination engine 410 can determine credentials for a specific application using an identification of the application, included as part application data for the application. Further depending upon implementation-specific or other considerations, the application specific credential determination engine 410 can determine credentials necessary to sign a user on for accessing an application based on an intercepted API request. For example, if an intercepted API request for an application indicates that a user name and a password are needed, then the application specific credential determination engine 410 can determine that a user name and a password are needed to sign on a user for accessing the application.

In a specific implementation, the application specific user credential determination engine 412 functions to determine user credentials for signing on a user to access an application. The application specific user credential determination engine 412 can determine user credentials for signing on a user based on credentials necessary to sign on a user for accessing an application, as determined by the application specific credential determination engine 410. The application specific user credential determination engine 412 can determine user credentials for signing on a user to access an application from user credentials stored in the user login credentials datastore 406. For example if the application specific credential determination engine 410 determines that a user name and a password are necessary to sign on a user for accessing an application, the application specific user credential determination engine 412 can determine a user name and a password of a user from the user credentials stored in the user login credentials datastore 406.

In a specific implementation, the application configuration determination engine 414 determines a configuration of an application for execution on a client device. For example, the application configuration determination engine 414 can determine settings for executing an application at the client device. The application configuration determination engine 414 can determine a configuration for an application from application data for the application. For example if application data specifies a specific configuration of the application for a user, then the application configuration determination engine 414 can determine the specific configuration of the application. Depending upon implementation-specific or other considerations, the application configuration determination engine 414 can determine a configuration of an application that is either or both specific to the client device which the application is executing on and a user of the client device accessing the application.

In a specific implementation, the remote communication engine 416 functions to transmit data from the API based application single sign on access system 408 to the API based single sign on application execution system 404. The remote communication engine 416 can transmit user credentials for signing on a user to access an application executing at the client device, as determined by the application specific user credential determination engine 412. Depending upon implementation-specific or other considerations, the remote communication engine 416 can transmit a configuration of an application executing on the client device, as determined by the application configuration determination engine 414.

In an example of operation of the example system shown in FIG. 4, the API based single sign on application execution system 404 sends an intercepted API request for signing a user on for accessing an application. In the example of operation of the example system shown in FIG. 4, the application specific credential determination engine 410 determines credentials necessary to sign a user on for accessing an application using the intercepted API request. Further, in the example of operation of the example system shown in FIG. 4, the application specific user credential determination engine 412 determines user credentials of the user for signing the user on for accessing the application based on the necessary credentials determined by the application specific credential determination engine 410. In the example of operation of the example system shown in FIG. 4, the remote communication engine 416 returns the user credentials of the user to the API based single sign on application execution system for signing on the user for accessing the application.

Figure 5:
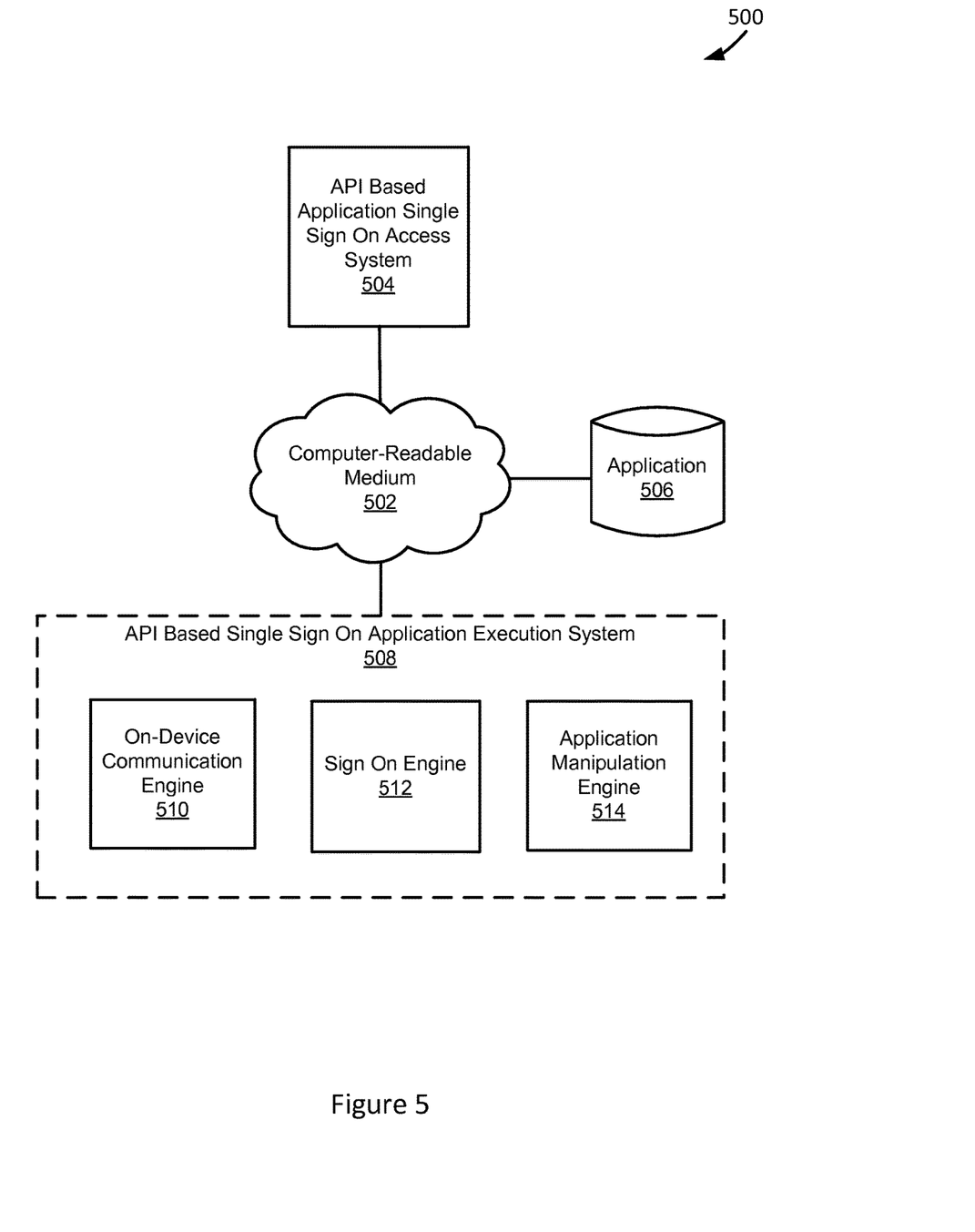
FIG. 5 depicts a diagram of an example of a system for performing single sign on of a user to access applications executed on a client device based on user credentials received remotely.

FIG. 5 depicts a diagram 500 of an example of a system for performing single sign on of a user to access applications executed on a client device based on user credentials received remotely. The example system shown in FIG. 5 includes a computer-readable medium 502, an API based application single sign on access system 504, an application datastore 506, an API based single sign on application execution system 508. In the example system shown in FIG. 5, the API based application single sign on access system 504, the application datastore 506, and the API based single sign on application execution system are coupled to each other through the computer-readable medium 502. The API based single sign on application execution system 508 is implemented on a client device.

In a specific implementation, the API based application single sign on access system 504 functions according to an applicable system for returning user credentials based on an intercepted API request, such as the API based application single sign on access systems described in this paper. The API based application single sign on access system 504 can determined credentials necessary to sign a user onto accessing an application executing at a client device using an intercepted API request to sign on the user. The API based application single sign on access system 504 can use determined credentials necessary to sign a user onto accessing an application to determined specific user credentials for signing a specific user onto the application. The API based application single sign on access system 504 can return determined user credentials to the client device. Depending upon implementation, specific or other considerations, the API based application single sign on access system 504 can determine a configuration of an application and send the configuration of the application to the client device.

In a specific implementation, the application datastore 506 functions to store application data of an application executed at the client device. Application data stored in the application datastore 506 can include an identification of an application. Depending upon implementation-specific or other considerations, application data stored in the application datastore 506 can include a configuration of the application on the client device. For example, if the application is configured uniquely for execution on the client device, application data for the application can identify the configuration of the application. Further depending upon implementation-specific or other considerations, application data stored in the application datastore 506 can be determined by either or both applicable systems in the API based application single sign on access system 504 and the API based single sign on application execution system 508.

In a specific implementation, the API based single sign on application execution system 508 functions according to an applicable system for providing single sign on access to applications using remote received user credentials, such as the API based single sign on application execution systems described in this paper. The API based single sign on application execution system 508 can be configured to intercept an API request for signing a user on to an application. The API based single sign on application execution system 508 can also be configured to sign on a user for accessing an application using user credentials received from a remote source in response to an intercepted API request. Depending upon implementation-specific or other considerations, the API based single sign on application execution system 508 can manipulate an application to execute according to a determined configuration for the application.

In the example system shown in FIG. 5, the API based single sign on application execution system 508 includes an on-device communication engine 510, a sign on engine 512, and an application manipulation engine 514. In a specific implementation, the on-device communication engine 510 functions according to an applicable engine for communicating with systems remote from the client device, such as the on-device communication engines described in this paper. The on-device communication engine 510 can communicate with the API based application single sign on access system 504. In communicating with the API based application single sign on access system 504, the on-device communication engine 510 can received determined user credentials used in signing on a user for accessing an application. Depending upon implementation-specific or other considerations, the on-device communication engine 510 can receive a determined configuration for an application executing at the client device.

In a specific implementation, the sign on engine 512 functions to sign on a user for accessing an application executing on the client device. In singing on a user, the user is agnostic as to that they are being signed on to an application. Specifically, the user does not view a login page and does not need to input their credentials for signing on to the application, after the user has initially input their user credentials, thereby accomplishing single sign on access. In singing on a user, the sign on engine 512 can populate field in a login page and activate a submit button for achieving sign on to an application. Depending upon implementation-specific or other considerations, the sign on engine 512 can generate an API response based on received user credentials to cause a user to be signed in for accessing an application. Further depending upon implementation-specific or other considerations, the sign on engine 512 can identify objects in a login page that need to be input in order to sign on a user and send an API call to the application to cause these fields to be populated. Depending upon implementation-specific or other considerations, the sign on engine 512 can identify an object that is used to submit data populated in determined fields for sign on a user, and send an API call to the application to cause the object to be activated after the fields have been populated.

In a specific implementation, the application manipulation engine 514 functions to manipulate an application according to a determined configuration of the application. Depending upon implementation-specific or other considerations, a configuration of an application can be determined from application data for the application. Further depending upon implementation-specific or other considerations, the application manipulation engine 514 can manipulate an application according to a configuration of an application specific to either or both a user or the client device. In manipulating the application, the application manipulation engine 514 can set up or change setting of an application based on a determined configuration of the application.

In an example of operation of the example system shown in FIG. 5, the API based application single sign on access system 504 provides user credentials to the API based single sign on application execution system 508. In the example of operation of the example system shown in FIG. 5, the sign on engine 512 agnostically signs on a user to access an application with the received user credentials. Further in the example of operation of the example system shown in FIG. 5, the application manipulation engine 514 manipulates the application executing at the client device according to a determined configuration of the application.

Figure 6:
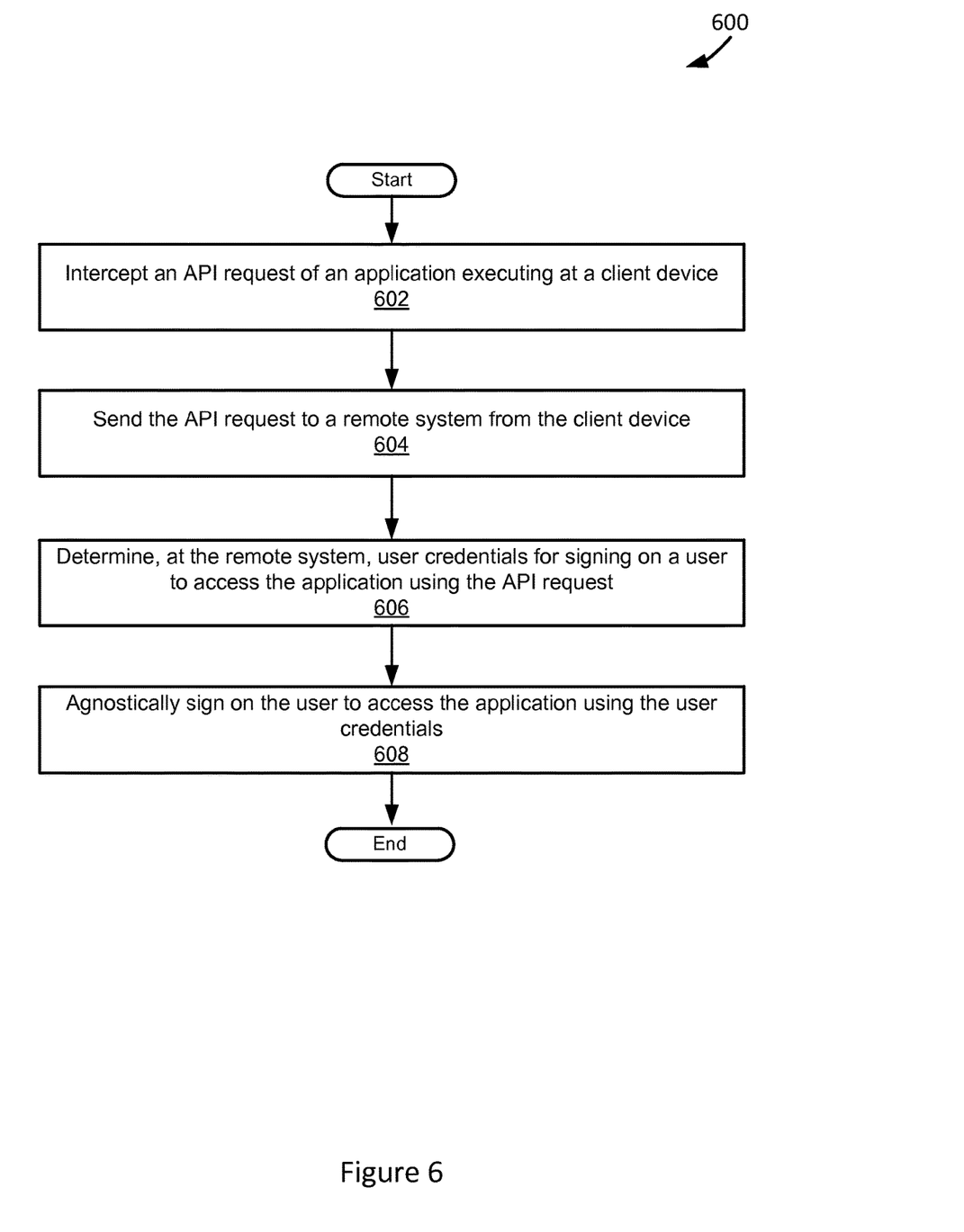
FIG. 6 depicts a flowchart of an example of a method for providing single sign on access to an application executing at a client device using an intercepted API request made by the application.

FIG. 6 depicts a flowchart 600 of an example of a method for providing single sign on access to an application executing at a client device using an intercepted API request made by the application. The flowchart 600 begins at module 602 where an API request is intercepted from an application executing at a client device 602. Depending upon implementation-specific or other considerations, an application executing at the client can reside entirely on the client device or partially reside at the client device, whereby the application is virtualized on the client device. An API request interception engine can intercept the API request. An API request intercepted at module 602 can be an API request for signing on a user to access an application.

The flowchart 600 continues to module 604, where the API request is sent to a remote system from the client device. The API request can be sent to an API based application single sign on access system. The API request can be sent to an API based application single sign on access system by an on-device communication engine residing at the client device.

The flowchart 600 continues to module 606, where, at the remote system, user credentials for signing on a user to access the application are determined using the API request. User credentials can be determined by an application specific user credential determination engine. User credentials can be determined based on necessary credentials for signing on a user of the application. For example, necessary credentials for signing on a user of the application can include that a user name and a password are needed to sign on the user for access to the application and the user name and the password of the user can be determined as a result. User credentials for signing on a user to access the application can be determined from user credentials input by a user of the client device and received from the client device. Depending upon implementation-specific or other considerations, user credentials can be input by the user at the beginning of a session with the client device or during a previous session with the client device.

The flowchart 600 continues to module 608, where the user is agnostically signed on to gain access to the application using the user credentials at the client device. As used in this paper, actions performed agnostically, are actions performed without prompting a user for input or guidance. A sign on engine can agnostically sign on the user to access the application based on the user credentials. Depending upon implementation-specific or other considerations, in agnostically signing on the user, the sign on engine can identify necessary fields to populate with the user credentials and send an API call to the application to cause the fields to populate with the user credentials. Further depending upon implementation-specific or other considerations, in agnostically signing on the user, the sign on engine can identify an object to activate to cause the user credentials populated in fields to be submitted and send an API call to the application to cause the object to active, thereby agnostically signing on the user for accessing the application at the client device.

Figure 7:
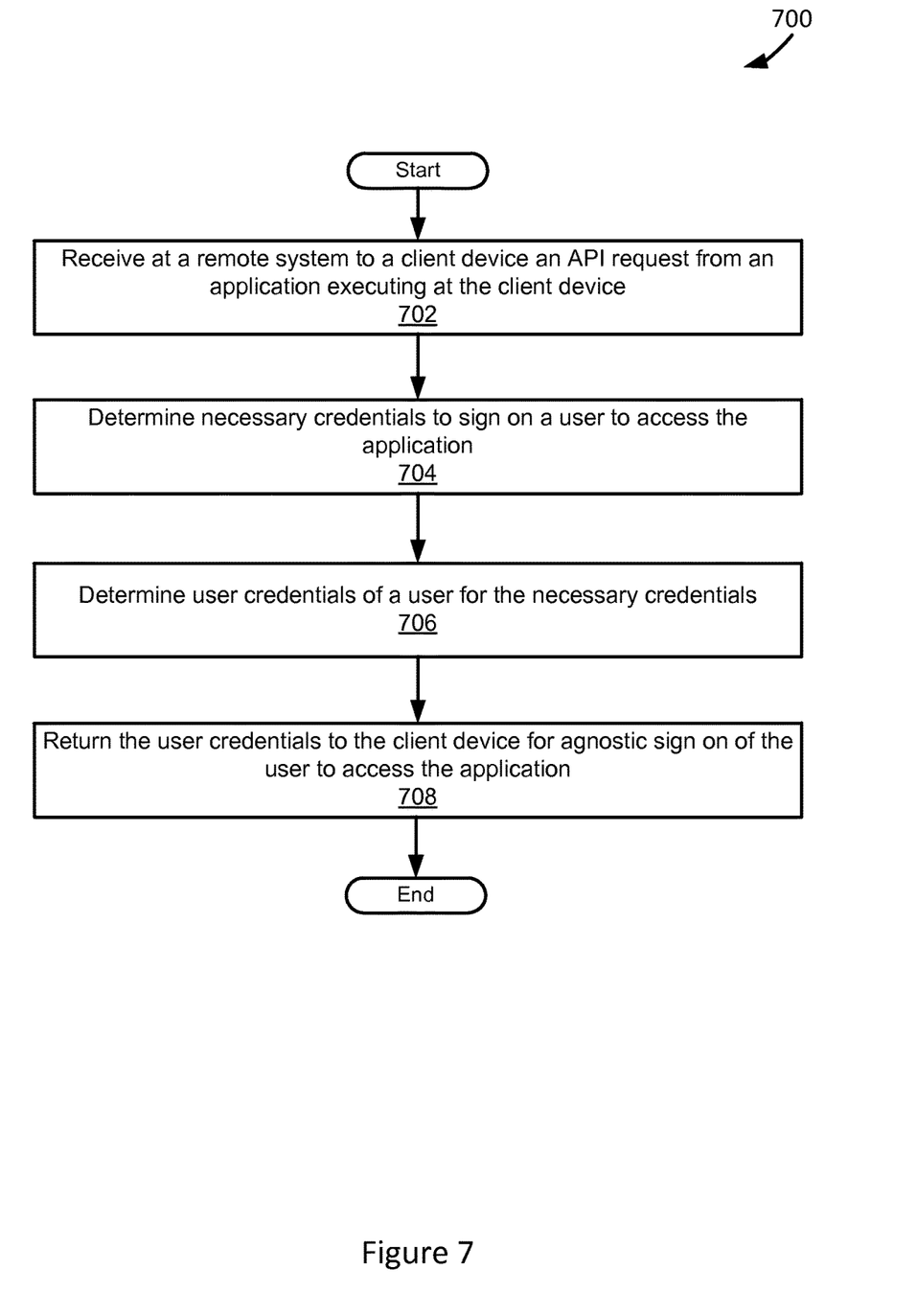
FIG. 7 depicts a flowchart of an example of a method for determining user credentials for single sign on access to an application executing on a client device using an intercepted API request.

FIG. 7 depicts a flowchart 700 of an example of a method for determining user credentials for single sign on access to an application executing on a client device using an intercepted API request. The flowchart 700 begins at module 702, where an API request intercepted from an application executing at a client device is received at a remote system from the client device. Depending upon implementation-specific or other considerations, an application executing at the client device can reside entirely on the client device or partially reside at the client device, whereby the application is virtualized on the client device. An API request interception engine can intercept the API request. An API received at module 702 can be an API request for signing on a user to access an application. The API request can be received at an API based application single sign on access system.

The flowchart 700 continues to module 704, where necessary credentials to sign on a user to access the application are determined. Necessary credentials to sign on a user to access the application can be determined by an application specific credential determination engine. Credentials necessary to sign on a user for accessing an application executing on the client device can be specific to applications. For example necessary credentials can include that only a user name is necessary to sign on for one application and determine a user name and a password are necessary to sign on for another application. Depending upon implementation-specific or other considerations, necessary credentials to sign on a user for accessing an application can be determined from application data for the application. Further depending upon implementation-specific or other considerations, credentials necessary to sign a user on for accessing an application can be determined from the intercepted API request received at module 702.

The flowchart 700 continues to module 706, where user credentials of a user for the necessary credentials are determined. User credentials can be determined by an application specific user credential determination engine. User credentials for signing on a user to access the application can be determined from user credentials input by a user of the client device and received from the client device. Depending upon implementation-specific or other considerations, user credentials can be input by the user at the beginning of a session with the client device or during a previous session with the client device.

The flowchart 700 continues to module 708, where the user credentials are returned to the client device for agnostic sign on of the user for accessing the application. The user credentials can be sent to an API based single sign on application execution system. A sign on engine residing at the client device can agnostically sign on the user for accessing the application executing at the client device based on the user credentials. In agnostically signing on the user for accessing the application, single sign on is provided for the application.

Figure 8:
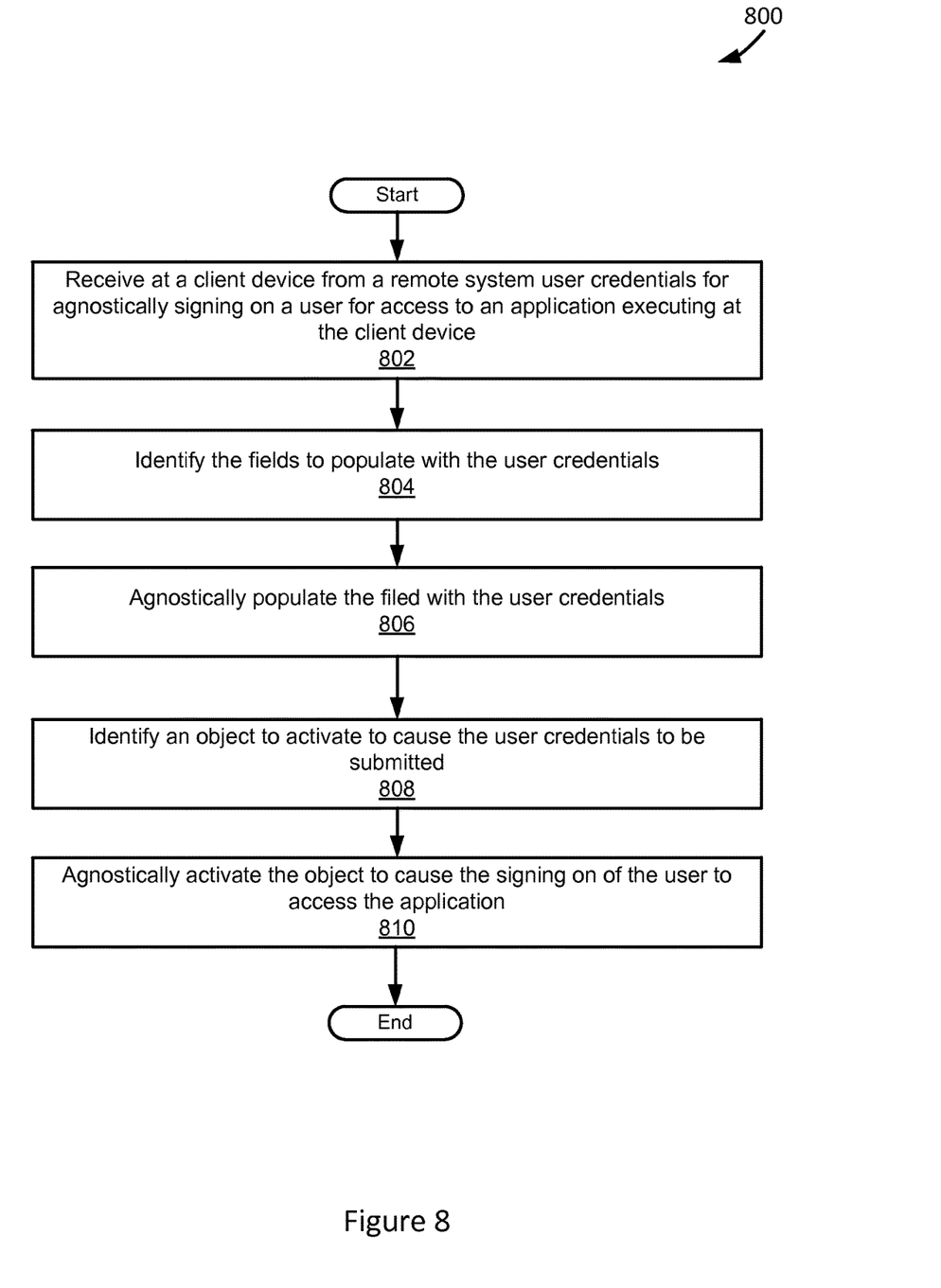
FIG. 8 depicts a flowchart of an example of a method for agnostically signing on a user for access to an application executing on a client device based on user credentials received from a remote system.

FIG. 8 depicts a flowchart 800 of an example of a method for agnostically signing on a user for access to an application executing on a client device based on user credentials received from a remote system. The flowchart 800 begins at module 802, where user credentials for agnostically signing on a user for access to an application executing at a client device are received at the client device from a remote system. The user credentials can be determined from an API request intercepted from the application executing at the client device. Depending upon implementation-specific or other considerations, an application executing at the client device can reside entirely on the client device or partially reside at the client device, whereby the application is virtualized on the client device. An API based single sign on application execution system can receive the user credentials at the client device from an API based application single sign on access system remote from the client device.

The flowchart 800 continues to module 804 where fields to populate with the user credentials for signing on a user are determined. The fields to populate with the user credentials for signing on a user can be determined by a sign on engine. The fields to populate with the user credentials for signing on a user can be determined from an API request intercepted from the application for signing on the user for accessing the application.

The flowchart 800 continues to module 806 where the fields determined at module 804 are populated agnostically from the user. A sign on engine can populate the fields in the application executing at the client device. Depending upon implementation-specific or other considerations, the sign on engine can generate and send an API call using the user credentials to the application to cause the field to become populated with the user credentials.

The flowchart 800 continues to module 808 where an object that upon activation submits user credentials populated in the fields and subsequently signs on the user for accessing the application is determined. The object to activate for signing on a user can be determined by a sign on engine. The object to activate for signing on a user can be determined from an API request intercepted from the application for signing on the user for accessing the application.

The flowchart 800 continues to module 810 where the object determined at module 808 is activated agnostically from the user. A sign on engine can activate the object in the application executing at the client device. Depending upon implementation-specific or other considerations, the sign on engine can generate and send an API call to the application to cause the object to become activated. As a result of the field begin populated and the object being activated agnostically from the user, single sign on access to the application is achieved.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

We claim:

1. A method comprising:
   intercepting, at a client device, an Application Programming Interface (API) request made by an application executing at the client device, the API request used for signing on a user of the client device to access the application, wherein the API request is intercepted at a layer between the application layer and the operating system layer of the client device;
   instructing an operating system of the client device to hide or not display a login window form associated with the API request;
   sending, from the client device via a network interface of the client device, the intercepted API request to a remote system from the client device;
   receiving, at the client device via the network interface of the client device, user credentials for signing on the user to access the application from the remote system, the user credentials determined using the intercepted API request; and
   without prompting the user for input and at the client device, signing on the user to access the application executing at the client device using the received user credentials by populating at least one field in the hidden or not displayed login window form with the user credentials and then activating a submit button of the login window form;
   further comprising, at the client device:
   inspecting a plurality of API requests of a plurality of applications executing at the client device;
   intercepting API requests of the plurality of API requests used for signing on the user to access the plurality of applications;
   receiving, from the remote system, a plurality of user credentials for accessing the plurality of applications based on the API requests;
   agnostically signing on the user to access the plurality of applications using the plurality of user credentials.

2. The method of claim 1, further comprising determining, at the remote system, application specific credentials needed to sign on the user to access the application.

3. The method of claim 2, wherein the application specific credentials are determined from the API request.

4. The method of claim 2, further comprising determining the user credentials based on the determined application specific credentials.

5. The method of claim 1, further comprising:
   receiving, at the client device, an application configuration of the application;
   manipulating the application at the client device according to the application configuration.

6. The method of claim 5, wherein the application configuration is specific to either or both the client device and the user.

7. The method of claim 1, further comprising:
   identifying an object to activate to cause the user credentials to be submitted for signing on the user to access the application at the client device;
   agnostically activating the object to cause the user credentials to be submitted.

8. The method of claim 1, wherein the API request is intercepted by a hypervisor layer of the client device.

9. A system comprising:
   a client device having one or more processors and memory, the client device including:
   an API request interception engine configured to intercept an Application Programming Interface (API) request made by an application executing at the client device and configured to instruct an operating system of the client device to hide or not display a login window form associated with the API request, wherein the API request is intercepted at a layer between an application layer and an operating system layer of the client device;
   an on-device communication engine configured to:
     send the intercepted API request to a remote system from the client device;
     receive user credentials for signing on the user to access the application from the remote system, the user credentials determined using the intercepted API request;
   a sign on engine configured to, without prompting the user for input, sign on the user to access the application executing at the client device using the received user credentials by populating at least one field in the hidden or not displayed login window form with the user credentials and then activating a submit button of the login window form;
   the API request interception engine is further configured to:
     inspect a plurality of API requests of a plurality of applications executing at the client device;

intercept API requests of the plurality of API requests used for signing on the user to access the plurality of applications;

the on-device communication engine further configured to receive, from the remote system, a plurality of user credentials for accessing the plurality of applications based on the API requests;

the sign on engine further configured to agnostically sign on the user to access the plurality of applications using the plurality of user credentials.

10. The system of claim 9, wherein the remote system comprises one or more processors and memory and an application specific credential determination engine configured to determine application specific credentials needed to sign on the user to access the application.

11. The system of claim 10, wherein the application specific credential determination engine is configured to determine the application specific credentials from the API request.

12. The system of claim 10, wherein the remote system further comprises an application specific user credential determination engine configured to determine the user credentials based on the determined application specific credentials.

13. The system of claim 9, wherein the on-device communication engine is further configured to receive an application configuration of the application, the client device further comprising an application manipulation engine configured to manipulate the application at the client device according to the application configuration.

14. The system of claim 13, wherein the application configuration is specific to either or both the client device and the user.

15. The system of claim 9, wherein the sign on engine is further configured to:

identify an object to activate to cause the user credentials to be submitted for signing on the user to access the application at the client device;

agnostically activate the object to cause the user credentials to be submitted.

16. The system of claim 9, wherein the API request interception engine is implemented as part of a hypervisor layer of the client device.

17. A system comprising:

means, at a client device, for intercepting, at a layer between an application layer and an operating system layer of the client device, an Application Programming Interface (API) request made by the application executing at the client device, the API request used for signing on a user of the client device to access the application, and for instructing an operating system of the client device to hide or not display a login window form associated with the API request;

a network interface, at the client device, for sending the intercepted API request to a remote system from the client device and means for receiving user credentials for signing on the user to access the application from the remote system, the user credentials determined using the intercepted API request; and means, at the client device, for signing on the user to access the application at the client device using the user credentials without prompting the user for input by populating at least one field in the hidden or not displayed login window form with the user credentials and then activating a submit button of the login window form;

further comprising, at the client device, means for:

inspecting a plurality of API requests of a plurality of applications executing at the client device;

intercepting API requests of the plurality of API requests used for signing on the user to access the plurality of applications;

receiving, from the remote system, a plurality of user credentials for accessing the plurality of applications based on the API requests;

agnostically signing on the user to access the plurality of applications using the plurality of user credentials.

18. The system of claim 17, wherein the means for intercepting an API request is implemented as part of a hypervisor layer of the client device.

* * * * *